US006670023B2

(12) United States Patent
Mueller (10) Patent No.: US 6,670,023 B2
(45) Date of Patent: *Dec. 30, 2003

(54) LAMINATE FOR CASE-READY PACKAGING INCLUDING A GAS-IMPERMEABLE FILM CAPABLE OF DELAMINATING INTO A GAS-PERMEABLE PORTION AND A GAS-IMPERMEABLE PORTION, AND A GAS-PERMEABLE FILM BONDED THERETO

(75) Inventor: Walter B. Mueller, Inman, SC (US)

(73) Assignee: Cryovac, Inc., Duncan, SC (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 198 days.

(21) Appl. No.: 08/982,958

(22) Filed: Dec. 2, 1997

(65) Prior Publication Data

US 2001/0049001 A1 Dec. 6, 2001

(51) Int. Cl.[7] .............................. B32B 3/00; B32B 3/26
(52) U.S. Cl. ..................... 428/189; 428/202; 428/304.4; 206/459.5; 206/524.2
(58) Field of Search ................................. 426/410, 415, 426/129, 396, 127, 383, 87, 67; 428/34.9, 35.4, 35.9, 36.6, 352, 359, 349, 202, 138, 304.4, 34.7, 34.3, 189; 206/459.5, 524.2, 524.1; 283/81

(56) References Cited

U.S. PATENT DOCUMENTS

| 1,042,119 A | 10/1912 | Kavanagh |
| 2,260,064 A | 10/1941 | Stokes ............................... 93/3 |
| 2,623,826 A | 12/1952 | Grinstead ..................... 99/174 |
| 2,814,381 A | 11/1957 | Stevick ......................... 206/45 |
| 2,925,346 A | 2/1960 | Harper et al. .................. 99/174 |
| 3,019,573 A | 2/1962 | Navikas ........................ 53/27 |
| 3,074,798 A | 1/1963 | Palmer ........................ 99/174 |

(List continued on next page.)

FOREIGN PATENT DOCUMENTS

| DE | 2 240 234 | 8/1972 |
| EP | 0 261 930 | 9/1987 |
| EP | 0 270 764 | 10/1987 |
| EP | 0 698 563 A1 | 8/1995 |
| EP | 0 713 766 A1 | 11/1995 |
| FR | 2 323 594 | 9/1975 |
| GB | 2 251 540 | 1/1991 |
| WO | 87/02965 | 11/1985 |
| WO | WO 98/23443 | 6/1998 |

*Primary Examiner*—Paul Thibodeau
*Assistant Examiner*—Kevin R Kruer
(74) *Attorney, Agent, or Firm*—Thomas C. Lagaly (57) ABSTRACT

A laminate generally includes:
  a. a multilayer, gas-impermeable film capable of delaminating into a gas-permeable portion and a gas-impermeable portion, the gas-permeable portion in adherence with the gas-impermeable portion at a predetermined intra-film cohesive strength; and
  b. a gas-permeable film bonded to the gas-impermeable film at a bond-strength that is greater than the intra-film cohesive strength between the gas-permeable and gas-impermeable portions of the gas-impermeable film. In this manner, when the laminate is subjected to a delaminating force, the laminate delaminates within the gas-impermeable film such that the gas-permeable portion of the gas-impermeable film remains bonded to the gas-permeable film.

A package and method of making a package using the laminate as a lidding film are also disclosed.

12 Claims, 6 Drawing Sheets

U.S. PATENT DOCUMENTS

| | | | |
|---|---|---|---|
| 3,360,382 A | 12/1967 | Miller | 99/174 |
| 3,561,668 A | 2/1971 | Bergstrom | 229/43 |
| 3,574,642 A | 4/1971 | Weinke | 99/174 |
| 3,638,784 A * | 2/1972 | Bodolay et al. | 206/45.34 |
| 3,681,092 A | 8/1972 | Titchenal et al. | 99/174 |
| 3,713,849 A | 1/1973 | Grindrod et al. | 99/174 |
| 3,716,180 A | 2/1973 | Bemiss et al. | 299/13 |
| 3,783,089 A | 1/1974 | Hurst et al. | 161/166 |
| 3,808,394 A | 4/1974 | Mominee et al. | 219/121 |
| 3,843,806 A | 10/1974 | Kishpaugh et al. | 426/106 |
| 4,055,672 A | 10/1977 | Hirsch et al. | 426/127 |
| 4,057,667 A * | 11/1977 | Wiggins et al. | 428/35 |
| 4,120,716 A * | 10/1978 | Bonet | 156/272 |
| 4,264,392 A | 4/1981 | Watt | 156/272 |
| 4,438,850 A | 3/1984 | Kahn | 206/634 |
| 4,522,835 A | 6/1985 | Woodruff et al. | 426/264 |
| 4,590,078 A | 5/1986 | Umina | 426/113 |
| 4,634,614 A | 1/1987 | Holzner | 428/35 |
| 4,667,814 A | 5/1987 | Wakamatsu et al. | 206/0.7 |
| 4,700,531 A | 10/1987 | Hsu et al. | 53/412 |
| 4,830,863 A * | 5/1989 | Jones | 426/118 |
| 4,840,271 A | 6/1989 | Garwood | 206/213 |
| 4,842,875 A | 6/1989 | Anderson | 426/118 |
| 4,847,148 A | 7/1989 | Schirmer | 428/332 |
| 4,886,372 A | 12/1989 | Greengrass et al. | 383/100 |
| 4,886,690 A | 12/1989 | Davis et al. | 428/36.6 |
| 4,889,731 A | 12/1989 | Williams, Jr. | 426/106 |
| 4,910,033 A | 3/1990 | Bekele et al. | 426/129 |
| 4,956,212 A * | 9/1990 | Bekele | 428/36.6 |
| 4,995,927 A * | 2/1991 | Garrett | 156/152 |
| 5,045,331 A | 9/1991 | Antoon, Jr. | 426/118 |
| 5,079,059 A | 1/1992 | Wyslotsky | 428/43 |
| 5,132,151 A | 7/1992 | Graney | 428/40 |
| 5,226,531 A | 7/1993 | Garwood | 206/213 |
| 5,296,291 A | 3/1994 | Mueller | 428/349 |
| 5,330,777 A * | 7/1994 | Mize, Jr. et al. | 426/383 |
| 5,346,735 A * | 9/1994 | Logan et al. | 428/36.7 |
| 5,348,752 A | 9/1994 | Gorlich | 426/129 |
| 5,387,449 A * | 2/1995 | Kunz et al. | 428/446 |
| 5,402,622 A * | 4/1995 | Stockley et al. | 53/427 |
| 5,419,096 A | 5/1995 | Gorlich | 53/432 |
| 5,419,097 A | 5/1995 | Gorlich et al. | 53/432 |
| 5,439,132 A * | 8/1995 | Gorlich | 220/359 |
| 5,447,591 A * | 9/1995 | Ennis | 156/229 |
| 5,492,705 A | 2/1996 | Porchia et al. | 426/106 |
| 5,518,790 A | 5/1996 | Huber et al. | 428/35.2 |
| 5,560,182 A | 10/1996 | Garwood | 53/432 |
| 5,631,036 A * | 5/1997 | Davis | 426/396 |
| 5,686,126 A | 11/1997 | Noel et al. | 426/127 |
| 5,759,650 A * | 6/1998 | Raines et al. | 428/35.7 |
| 5,779,050 A * | 7/1998 | Kocher et al. | 206/497 |
| 5,919,547 A * | 7/1999 | Kocher et al. | 428/138 |
| 5,948,513 A * | 9/1999 | Turnbull et al. | 428/201 |
| 6,032,800 A * | 3/2000 | Kocher et al. | 206/459.5 |
| 6,051,305 A * | 4/2000 | Hsu | 428/105 |

* cited by examiner

LAMINATE FOR CASE-READY PACKAGING INCLUDING A GAS-IMPERMEABLE FILM CAPABLE OF DELAMINATING INTO A GAS-PERMEABLE PORTION AND A GAS-IMPERMEABLE PORTION, AND A GAS-PERMEABLE FILM BONDED THERETO

BACKGROUND OF THE INVENTION

The present invention relates to a gas-impermeable laminate that delaminates into gas-permeable and gas-impermeable portions. More specifically, the invention pertains to packaging for products, such as food (e.g., fresh red meat or poultry) products, that are initially enclosed by the gas-impermeable laminate under certain environmental conditions (e.g., a low-oxygen environment). The initial environmental conditions within the package may subsequently be altered by peelably removing the gas-impermeable portion of the laminate from the gas-permeable portion, thereby allowing air to enter the package to effect a desired change in the packaged product.

Historically, large sub-primal cuts of meat have been butchered and packaged in each supermarket. This arrangement has long been recognized to be inefficient and expensive. It would instead be preferable to butcher and package the meat at a central processing facility which benefits from economies of scale, and then ship the packaged meat to individual supermarkets or other retail outlets such as is done, for example, with many poultry products. It is believed that central processing of meat would also lead to a higher quality, more sanitary product with a longer shelf-life than meat which is butchered and packaged in individual supermarkets.

Fresh red meat presents a particular challenge to the concept of centralized processing and packaging due to its oxygen-sensitivity. Such oxygen-sensitivity is manifested in the shelf-life and appearance (color) of a packaged meat product. For example, while a low-oxygen packaging environment generally increases the shelf-life of a packaged meat product (relative to meat products packaged in an environment having a higher oxygen content), red meat has a tendency to assume a purple color when packaged in the absence of oxygen or in an environment having a very low oxygen concentration, i.e., below about 5% oxygen. Unfortunately, such a purple color is undesirable to most consumers, and marketing efforts to teach the consumer about the acceptability of the purple color have been largely ineffective. When meat is exposed to a sufficiently high concentration of oxygen, e.g., as found in air, it assumes a bright red color which most consumers associate with freshness. After 1 to 3 days of such exposure, however, meat assumes a brown color which, like the purple color, is undesirable to most consumers (and indicates that the meat is beginning to spoil).

Thus, in order to effectively butcher and package meat products in a central facility for distribution to retail outlets, the meat would desirably be packaged, shipped, and stored in a low-oxygen environment for extended shelf-life, and then displayed for consumer sale in a relatively high-oxygen environment such that the meat is caused to "bloom" (or, more accurately, "re-bloom") into a red color just before being placed in a retail display case. While in the retail display case, the meat product is desirably contained in a package which protects it from microbial and other contamination. In order to attain the maximum economic benefit from centralized packaging, the package in which the meat product is displayed for consumer sale is the same package in which the meat product is initially packaged and shipped from the central processing facility. As can be appreciated, centralized butchering and packaging of fresh red meat presents a number of difficult packaging challenges.

A variety of packages, known as "case-ready packages," have been developed in an effort to overcome the foregoing challenges. One type of case-ready package is a peelable "vacuum-skin" package ("peelable VSP"). A traditional peelable VSP includes a lidding film that separates into gas-permeable and gas-impermeable portions and which encloses, e.g., a fresh red meat or poultry product that is disposed on a support member. The lid is thermoformable, i.e., capable of being formed into a desired shape upon the application of heat, and is thermoformed about the product on the support member by means of heat and differential pressure. In so doing, the lid is also bonded to the support member outside the periphery of the product. Virtually all of the air is evacuated from the interior of the package so that the lid conforms very closely to the contour of the packaged product. (For further details see, e.g., U.S. Pat. Nos. Re 30,009 (Purdue et al.) and 5,346,735 (Logan et al.), the disclosures of which are hereby incorporated herein by reference). Another type of peelable VSP is used, e.g., for high-profile meat cuts such as beef roasts, and consists of a pouch in which the meat product is contained. The interior of the pouch is evacuated so that it conforms to the contour of the packaged product. The pouch includes an outer, gas-impermeable portion that is peelably removable from an inner, gas-permeable portion to allow the meat product to re-bloom prior to placing the package in a retail display case. Such a package is exemplified in, e.g., U.S. Ser. No. 08/940, 673, now abandoned entitled PACKAGE COMPRISING AN INNER, GAS-PERMEABLE ENCLOSURE AND AN OUTER, GAS-IMPERMEABLE ENCLOSURE PEELABLY ADHERED TO THE INNER ENCLOSURE and filed Sep. 30, 1997, the disclosure of which is hereby incorporated herein by reference.

Similar to a peelable VSP, a peelable "modified-atmosphere" package ("peelable MAP") includes a lidding film that separates into gas-permeable and gas-impermeable portions and which encloses, e.g., a fresh red meat or poultry product that is disposed within a support member having a peripheral flange to which the lid is secured. Prior to securing the lid to the support member, air is generally evacuated from the interior of the support member and replaced by a gas which extends the shelf-life of the packaged product. The gas-impermeable portion of the lid is peelably removed prior to retail display so that the packaged product is displayed in a state of re-bloom. An example of such a package is disclosed in, e.g., U.S. Pat. No. 5,686,126, the disclosure of which is hereby incorporated herein by reference.

While peelable VSP and MAP case-ready packages have been and continue to be successful, there is always a need and desire for improvements. For instance, as with any package, peelable VSP and MAP packages must contain some sort of labeling thereon that provides certain information to the consumer such as, e.g., product information, pricing, identification of the company from which the packages originated, etc. In order to be clearly visible to the consumer, such labels are placed on the lidding film because the transparent film is always facing the consumer in the retail display case so that both the packaged product and label can be inspected without having to move or handle the package. For the same reasons that it is desirable to package fresh red meat and poultry products at central processing facilities, it would also be desirable for the packages to be labeled with individualized information at the central processing facilities. Currently, however, such labels must be prepared and affixed to the gas-permeable portion of the lid at the retail facility following the removal of the gas-impermeable portion of the lidding film. This is necessary because lidding films for peelable VSP and MAP packages do not generally facilitate centralized printing and/or labeling. In the first place, it is not practical to apply the label to the upper, gas-impermeable portion of the lid because this portion is peeled from the packages and discarded prior to placing the packages in the retail display case. Secondly, placement of the printed image or label within the lidding film such that it remains on the package after the gas-impermeable portion is removed has also proven difficult. For example, commercially successful lidding films delaminate such that only a gas-permeable portion of a coextruded, multilayer film remains on the package after delamination, and it would be impossible to interject a label between two layers of a coextruded film. Labels or printed indicia applied to the side walls or bottom surface of the support tray are not attractive to consumers who are accustomed to labeling on the upper surface of packages. Thus, while case-ready packages of the type discussed above have obviated the need for in-store butchering, retail workers are still required to create and apply a unique label for each package, and it is presently not possible for a pre-printed image to be centrally applied to the lidding film such that it will remain on the package after the gas-impermeable portion of the lid is removed and the package is placed in a retail display case.

Another aspect of case-ready packages in which improvement is sought concerns the gas-permeable portion of the lidding film. Particularly with modified-atmosphere packages, it is often necessary that the gas-permeable lid portion contain very small perforations (e.g., less than about 250 microns in diameter) in order to increase the rate at which the packaged meat product re-blooms after removal of the gas-impermeable lid portion. While perforations do not present a problem from the standpoint of proper meat or poultry packaging, purge (juices) from packaged meat or poultry could potentially leak from the package through the perforations in the event that the packages are inadvertently tipped sideways or inverted after the gas-impermeable lid portion has been peeled from the package, e.g., in the retail display case or in a consumer's shopping cart or grocery bag. Thus, it would be desirable that the remaining, gas-permeable portion of the lidding film not have perforations that would permit such leakage.

Accordingly, a need exists for a case-ready package with a lidding film that can carry product information and other indicia that is applied at a central processing and packaging facility but which remains on the package lid after removal of the gas-impermeable portion so that the information is visible to the consumer. A need also exists for a case-ready package that has a rapid rate of re-bloom without the necessity for open perforations in the remaining gas-permeable lid portion after removal of the gas-impermeable portion.

SUMMARY OF THE INVENTION

Those needs are met by the present invention which provides a laminate, comprising:

a. a multilayer, substantially gas-impermeable film capable of delaminating into a gas-permeable portion and a gas-impermeable portion, the gas-permeable portion in adherence with the gas-impermeable portion at a predetermined intra-film cohesive strength; and b. a gas-permeable film bonded to the gas-impermeable film at a bond-strength that is greater than the intra-film cohesive strength between the gas-permeable and gas-impermeable portions of the gas-impermeable film, whereby, the laminate delaminates within the gas-impermeable film when the laminate is subjected to a delaminating force such that the gas-permeable portion of the gas-impermeable film remains bonded to the gas-permeable film.

Another aspect of the invention pertains to a package, comprising:

a. a product support member having a cavity formed therein, a product being disposed within the cavity; and b. a lid comprising the laminate as described above that encloses the product within the cavity and is bonded to the support member.

A further aspect of the invention is directed to a method of making a package, comprising:

a. providing a product support member having a cavity formed therein;

b. placing a product in the cavity;

c. providing a laminate as described above; and d. bonding the laminate to the support member as a lid to thereby enclose the product within the cavity of the support member.

DEFINITIONS

As used herein, the term "laminate" refers to a multiple-film composite structure having two or more films bonded together by any suitable means, including adhesive bonding; reactive surface modification (e.g., corona treatment, flame treatment, or plasma treatment); heat treatment; pressure treatment; etc., including combinations thereof.

As used herein, the term "film" refers to a thermoplastic material, generally in sheet or web form, having one or more layers formed from polymeric or other materials. A film can be a monolayer film (having only one layer) or a multilayer film (having two or more layers).

As used herein, the term "layer" refers to a discrete film component which is coextensive with the film and has a substantially uniform composition. In a monolayer film, the "film" and "layer" would be one and the same.

Unless otherwise specified herein, the term "multilayer" refers to a film comprising two or more layers which are bonded together by one or more of the following methods: coextrusion, extrusion coating, vapor deposition coating, solvent coating, emulsion coating, or suspension coating.

As used herein, the terms "extrusion," "extrude," and the like refer to the process of forming continuous shapes by forcing a molten polymeric material through a die, followed by cooling or chemical hardening. Immediately prior to extrusion through the die, the relatively high-viscosity polymeric material is fed into a rotating screw, which forces it through the die.

As used herein, the term "coextrusion," "coextrude," and the like refer to the process of extruding two or more materials through a single die with two or more orifices arranged so that the extrudates merge and weld together into a laminar structure before chilling, i.e., quenching. Coextrusion can be employed in film blowing, free film extrusion, and extrusion coating processes.

As used herein, the phrases "reactive surface modification," "reactively modifying the surface of,"

"reactively-modified surface" and the like refer to chemically altering the surface of a film in order to incorporate reactive species onto such film surface, e.g., to provide the film surface with auto-adhesion functionality (i.e., rendering the surface capable of adhering to another surface without the need for an adhesive). Specific examples of reactive surface modification include corona treatment, plasma (ionized gas) treatment, and flame treatment, with corona treatment being preferred. The surface of a film which has been subjected to reactive surface modification is referred to as a "reactively-modified surface" or, in the case of corona treatment, a "corona-treated surface."

As used herein, the terms "delaminate," "delaminating," and the like refer generally to the internal separation of a multilayer film within a layer and/or at an inter-layer (i.e., layer/layer) interface within the coextruded film when such film, or laminate of which the coextruded film is a component, is subjected to a delaminating force of sufficient magnitude. A laminate in accordance with the present invention includes at least one multilayer film having an intra-film cohesive strength which is both lower than the inter-film bond-strengths between the component films of the laminate and also lower than the intra-film cohesive strengths of the other films in the laminate. In this manner, the multilayer film component of the laminate internally separates, i.e., delaminates, when the laminate is subjected to a delaminating force that exceeds the intra-film cohesive strength of the coextruded film. The internal separation preferably occurs at a pre-selected layer/layer interface, and/or within a pre-selected layer, such that the multilayer film delaminates into a gas-permeable portion and a gas-impermeable portion.

As used herein, the term "portion," as modified by the terms "gas-permeable" or "gas-impermeable," refers to a delaminated segment of a multilayer film that includes one or more component layers of the multilayer film. In accordance with the present invention, a multilayer, gas-impermeable film delaminates into at least two portions, one of which is gas-permeable while the other is gas-impermeable.

As used herein, the term "intra-film cohesive strength" refers to the internal force with which a film remains intact, as measured in a direction that is generally perpendicular to the plane of the film. In a multilayer film, intra-film cohesive strength is provided both by inter-layer adhesion (the adhesive strength between the layers which binds them to one another) and by the intra-layer cohesion of each film layer (i.e., the cohesive strength of each of the film layers). Intra-film cohesive strength is measured by the minimum amount of force (the "delaminating force") required to internally separate (delaminate) a film in accordance with ASTM F904-91. In a monolayer film, intra-film cohesive strength is provided only by the intra-layer cohesion of the layer which constitutes the film.

As used herein, the term "bond-strength" refers to the adhesive force with which two films in a laminate are joined to one another and is measured by the minimum amount of force required to ply-separate the two films in accordance with ASTM F904-91.

As used herein, the term "gas-permeable" refers to a film or film portion which admits at least about 1,000 cc of gas, such as oxygen, per square meter of film per 24 hour period at 1 atmosphere and at a temperature of 73° F. (at 0% relative humidity). More preferably, a gas-permeable film or film portion admits at least 5,000, even more preferably at least 10,000, such as at least 15,000, 20,000, 25,000, 30,000, 35,000, 40,000, and 50,000, and most preferably at least 100,000 cc of oxygen per square meter per 24 hour period at 1 atmosphere and at a temperature of 73° F. (at 0% relative humidity). In accordance with the present invention, a gas-permeable film or film portion can itself have the aforedescribed levels of gas permeability or, alternatively, can be a film or film portion which does not inherently possess the aforedescribed levels of gas permeability but which is altered, e.g., perforated, to render the film gas-permeable as defined above.

As used herein, the term "substantially gas-impermeable" refers to a film or film portion which admits less than 1000 cc of gas, such as oxygen, per square meter of film per 24 hour period at 1 atmosphere and at a temperature of 73° F. (at 0% relative humidity). More preferably, a substantially gas-impermeable film or film portion admits less than about 500, such as less than 300, and less than 100 cc of gas, more preferably still less than about 50 cc, and most preferably less than 25 cc, such as less than 20, less than 15, less than 10, less than 5, and less than 1 cc of gas per square meter per 24 hour period at 1 atmosphere and at a temperature of 73° F. (at 0% relative humidity).

As used herein, the phrase "product support member" refers to a component of a package on or in which a product is disposed. Meat products are typically disposed in a tray-like package component comprising polymeric sheet material which has been thermoformed into a desired shape for supporting the meat product. A product support member preferably includes a cavity into which the product is disposed and a peripheral flange which provides a sealing surface for attachment of a lid to the support member to thereby enclose the product within the cavity.

As used herein, the phrase "ethylene/alpha-olefin copolymer" generally designates copolymers of ethylene with one or more comonomers selected from $C_3$ to $C_{20}$ alpha-olefins, such as 1-butene, 1-pentene, 1-hexene, 1-octene, methyl pentene and the like, in which the polymer molecules comprise long chains with relatively few side chain branches. These polymers are obtained by low pressure polymerization processes and the side branching which is present will be short compared to non-linear polyethylenes (e.g., LDPE, a low density polyethylene homopolymer). Ethylene/alpha-olefin copolymers generally have a density in the range of from about 0.86 g/cc to about 0.94 g/cc. The term linear low density polyethylene (LLDPE) is generally understood to include that group of ethylene/alpha-olefin copolymers which fall into the density range of about 0.915 to about 0.94 g/cc. Sometimes linear polyethylene in the density range from about 0.926 to about 0.94 is referred to as linear medium density polyethylene (LMDPE). Lower density ethylene/alpha-olefin copolymers may be referred to as very low density polyethylene (VLDPE, typically used to refer to the ethylene/butene copolymers available from Union Carbide with a density ranging from about 0.88 to about 0.91 g/cc) and ultra-low density polyethylene (ULDPE, typically used to refer to the ethylene/octene copolymers supplied by Dow).

The phrase "ethylene/alpha-olefin copolymer" also includes homogeneous polymers such as metallocene-catalyzed EXACT™ linear homogeneous ethylene/alpha-olefin copolymer resins obtainable from the Exxon Chemical Company, of Baytown, Tex.; TAFMER™ linear homogeneous ethylene/alpha-olefin copolymer resins obtainable from the Mitsui Petrochemical Corporation; and long-chain branched, metallocene-catalyzed homogeneous ethylene/alpha-olefin copolymers available from The Dow Chemical Company, known as AFFINITY™ resins. The phrase "homogeneous polymer" refers to polymerization reaction products of relatively narrow molecular weight distribution and relatively narrow composition distribution. Homogeneous polymers are structurally different from heterogeneous polymers (e.g., ULDPE, VLDPE, LLDPE, and LMDPE) in that homogeneous polymers exhibit a relatively even sequencing of comonomers within a chain, a mirroring of sequence distribution in all chains, and a similarity of length of all chains, i.e., a narrower molecular weight distribution. Furthermore, homogeneous polymers are typically prepared using metallocene, or other single-site type catalysts, rather than using Ziegler-Natta catalysts. Such single-site catalysts typically have only one type of catalytic site, which is believed to be the basis for the homgeniety of the polymers resulting from the polymerization.

As used herein, the term "olefin" generally refers to any one of a class of monounsaturated, aliphatic hydrocarbons of the general formula $C_nH_{2n}$, such as ethylene, propylene, and butene. The term may also include aliphatics containing more than one double bond in the molecule such as a diolefin or diene, e.g., butadiene.

As used herein, the term "polyolefin" refers to olefin polymers and copolymers, especially ethylene and propylene polymers and copolymers, and to polymeric materials having at least one olefinic comonomer, such as ethylene vinyl acetate copolymer and ionomer. Polyolefins can be linear, branched, cyclic, aliphatic, aromatic, substituted, or unsubstituted. Included in the term polyolefin are homopolymers of olefin, copolymers of olefin, copolymers of an olefin and a non-olefinic comonomer copolymerizable with the olefin, such as vinyl monomers, modified polymers of the foregoing, and the like. Modified polyolefins include modified polymers prepared by copolymerizing the homopolymer of the olefin or copolymer thereof with an unsaturated carboxylic acid, e.g., maleic acid, fumaric acid or the like, or a derivative thereof such as the anhydride, ester metal salt or the like. It could also be obtained by incorporating into the olefin homopolymer or copolymer, an unsaturated carboxylic acid, e.g., maleic acid, fumaric acid or the like, or a derivative thereof such as the anhydride, ester metal salt or the like.

DETAILED DESCRIPTION OF THE INVENTION

Figure 1:
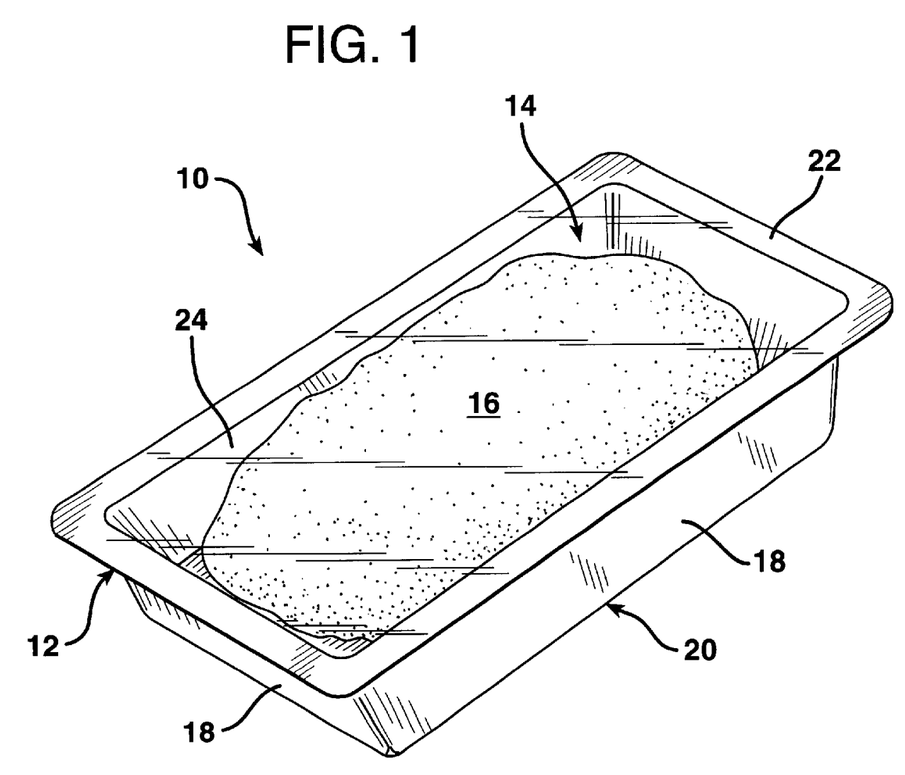
FIG. 1 is a perspective view a package in accordance with the present invention, including a product support member with a product disposed therein and a lid heat-sealed to the support member to enclose the product within the support member and lid.

FIG. 1 illustrates a peelable, modified-atmosphere package 10 in accordance with present invention. While the invention is equally applicable to other types of case-ready packaging as described above (e.g., peelable VSP), for simplicity the invention will be described in connection with a MAP only. Package 10 includes product support member 12 having a cavity 14 formed therein and a product 16 disposed within the cavity. Support member 12 is preferably in the form of a tray having side walls 18 and a base 20 which define the cavity 14, and further includes a peripheral flange 22 extending outwardly from the cavity. A lid 24 encloses the product 16 within cavity 14 by being heat-welded to flange 22.

Figure 2:
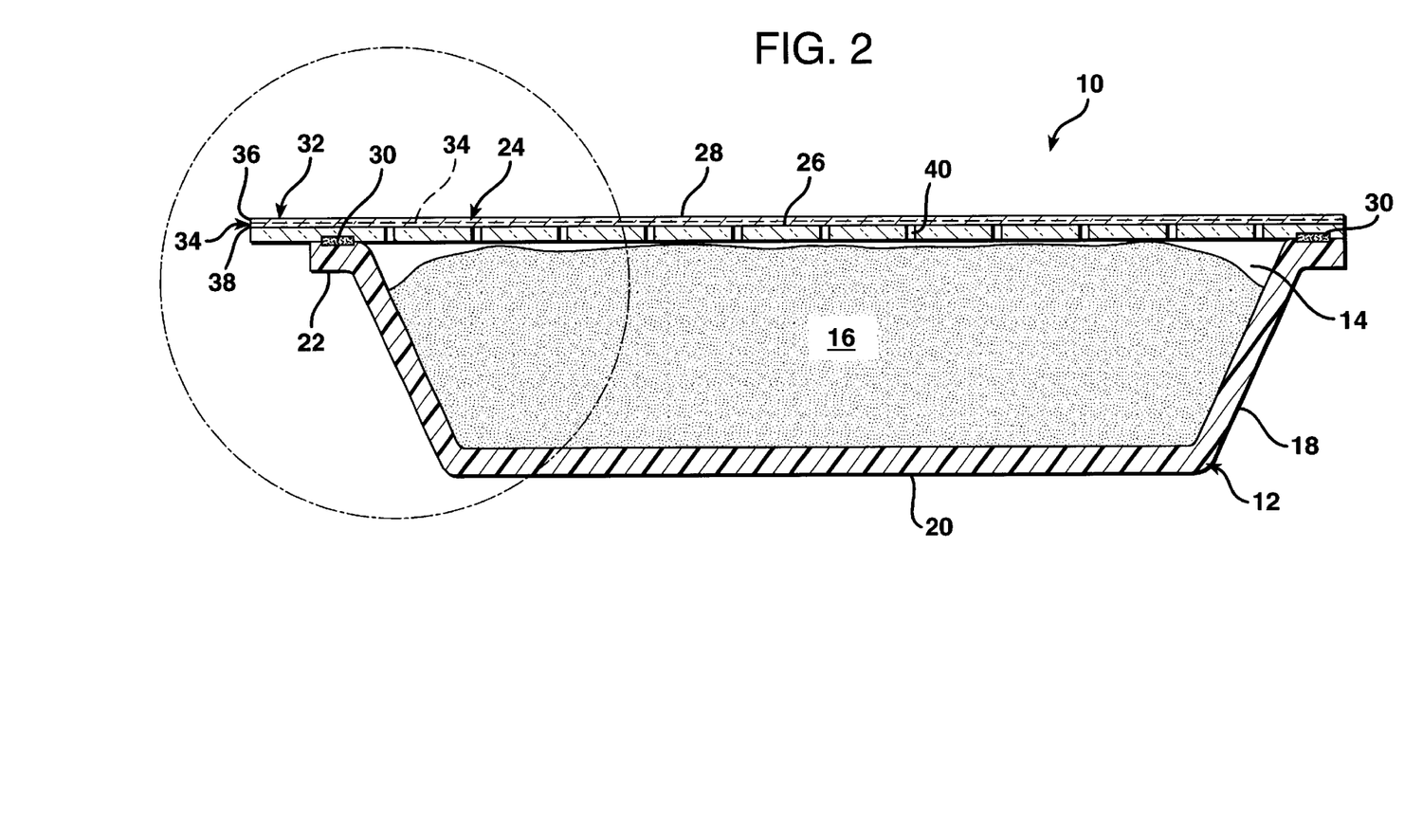
FIG. 2 is a cross-sectional view the package shown in FIG. 1.

FIG. 2 shows package 10 in greater detail. As will be described with greater specificity below, lid 24 is a laminate in accordance with the present invention comprising a lower gas-permeable film 26 which is in direct contact with flange 22 and, bonded to the gas-permeable film, a multilayer, substantially gas-impermeable film 28 capable of delaminating into gas-permeable and gas-impermeable portions. A heat-weld (or heat-seal) 30 bonds lid 24 to flange 22 of support member 12, and preferably extends continuously around the upper surface of flange 22 to thereby hermetically seal product 16 within package 10. In this manner, lid 24 and support member 12 preferably form a substantially gas-impermeable enclosure for product 16 which substantially completely protects the product from contact with the surrounding environment including, in particular, atmospheric oxygen, but also including dirt, dust, moisture, microbial contaminates, etc., especially when product 16 is a food product. When product 16 is oxygen-sensitive, i.e., perishable, degradable, or otherwise changeable in the presence of oxygen, such as fresh red meat products (e.g., beef, veal, lamb, pork, etc.), poultry, fish, cheese, etc., it is preferred that product 16 be packaged in a low-oxygen environment within package 10 to maximize the shelf-life of the product.

Support member 12 can have any desired configuration or shape, e.g., rectangular, round, oval, etc. Similarly, flange 22 may have any desired shape or design, including a simple, substantially flat design which presents a single sealing surface as shown, or a more elaborate design which presents two or more sealing surfaces, such as the flange configurations disclosed in U.S. Pat. Nos. 5,348,752 and 5,439,132, the disclosures of which are hereby incorporated herein by reference. The flange may also include a peripheral lip positioned adjacent and exterior to the sealing surface to facilitate the peelable delamination of lid 24, such as disclosed in U.S. Ser. No. 08/733,843, entitled PACKAGE HAVING PEEL INITIATION MECHANISM and filed Oct. 18, 1996, the disclosure of which is hereby incorporated herein by reference.

Suitable materials from which support member 12 can be formed include, without limitation, polyvinyl chloride, polyethylene terephthalate, polystyrene, polyolefins such as high density polyethylene or polypropylene, paper pulp, nylon, polyurethane, etc. The support member may be foamed or non-foamed as desired, and preferably provides a barrier to the passage of oxygen therethrough, particularly when product 16 is an oxygen-sensitive food product. When such oxygen-sensitive products are to be packaged in a low-oxygen environment (to thereby extend their shelf-life), support member 12 preferably allows less than or equal to about 1000 cc of oxygen to pass, more preferably less than about 500 cc of oxygen, more preferably still less than about 100 cc, even more preferably less than about 50 cc, and most preferably less than about 25 cc of oxygen to pass per square meter of material per 24 hour period at 1 atmosphere and at a temperature of 73° F. (at 0% relative humidity). Support member 12 may comprise a material which itself provides a barrier to the passage of oxygen, e.g., vinylidene chloride copolymer, nylon, polyethylene terephthalate, ethylene/vinyl alcohol copolymer, etc. Alternatively, support member 12 may have a substantially gas-impermeable sealant film laminated or otherwise bonded to the inner or outer surface thereof as described in U.S. Pat. Nos. 4,847,148 and 4,935,089, and in U.S. Ser. No. 08/326,176, now abandoned, filed Oct. 19, 1994 and entitled "Film/Substrate Composite Material" (published as EP 0 707 955 A1 on Apr. 24, 1996), the disclosures of which are hereby incorporated herein by reference. Any such sealant film preferably includes an oxygen-barrier material such as e.g., vinylidene chloride copolymer (saran), nylon, polyethylene terephthalate, ethylene/vinyl alcohol copolymer, etc. Further, when applied to the inner surface of the support member and upper surface of the flange, such sealant film may also be used to improve the heat-weld bond between the lid and support member.

Although product 16 is illustrated as having a maximum height which is below the maximum height of support member 12, i.e., the level at which flange 22 is located, the invention is not limited to such "low profile" products. Rather, "high profile" products may also be packaged in accordance with the present invention, i.e., those having a maximum height which is above the level at which flange 22 is located so that the portion of the product which extends above the level of flange 22 will be in contact with lid 24.

When packaged as shown in FIG. 2, product 16 can be maintained under any desired environmental conditions by virtue of the substantial gas-impermeability of lid 24 (and support member 12) when gas-impermeable film 28 is bonded to gas-permeable film 26. For example, when product 16 is a fresh red meat product, a low oxygen environment (e.g., less than 0.5% oxygen by volume) is preferably maintained within cavity 14 to preserve the meat product during shipping and storage. However, under such conditions, a fresh red meat product will have a purple color that is undesirable to consumers. For this reason, lid 24 is delaminatable such that, after delamination, atmospheric oxygen can enter the package, thereby causing the fresh red meat product to re-bloom to a more desirable color of red.

Delamination is performed simply and easily by a retail worker just prior to placing the package in a display case for customer purchase as follows. The worker grasps extended portion 32 of lid 24 and pulls generally upwards and backwards (i.e., towards an opposite edge or corner of the package), thereby causing gas-impermeable film 28 to delaminate along a predetermined plane 34 therewithin (as represented by the dashed line in film 28). The portion 36 of film 28 above plane 34 is substantially gas-impermeable while the portion 38 below the delamination plane is permeable to gas and, in particular, oxygen. The gas-impermeable portion 36 of film 28 is thus removed from the package while the gas-permeable portion 38 remains bonded to gas-permeable film 26. Atmospheric oxygen can then enter the package to cause product 16 to re-bloom, preferably within about 30–45 minutes.

In order to achieve complete re-bloom within a 30–45 minute time-frame, gas-permeable film 26 preferably contains perforations 40 while gas-permeable portion 38 of film 28 is preferably very thin and/or comprises a highly gas-permeable material. In this manner, gas-permeable film 26 can be relatively thicker and/or formed of a relatively tough material to provide the remaining lid (after peeling) with abuse-resistance and sufficient strength to allow a number of packages to be placed in a stack in the retail display case (which is necessary due to space constraints) without the overlying packages in the stack tearing through the remaining lid. At the same time, the gas-permeable portion 38 of film 28 that remains bonded to gas-permeable film 26, thereby preventing liquids (e.g., juices from a packaged meat or poultry product) from leaking into or out of the package via the perforations. Gas-permeable portion 38 also prevents any dirt or air-borne contaminates small enough to pass through the perforations from entering the cavity 14 of package 10. Moreover, a trap-printed image or label may be inserted between films 26 and 28 prior to laminating the two films together. In this manner, package 10 may be provided with consumer-specific information in the form of a pre-printed image and/or label at the same centralized packaging facility in which the package is made, thereby making it unnecessary for such printing or labeling to be carried out at retail.

Figure 3:
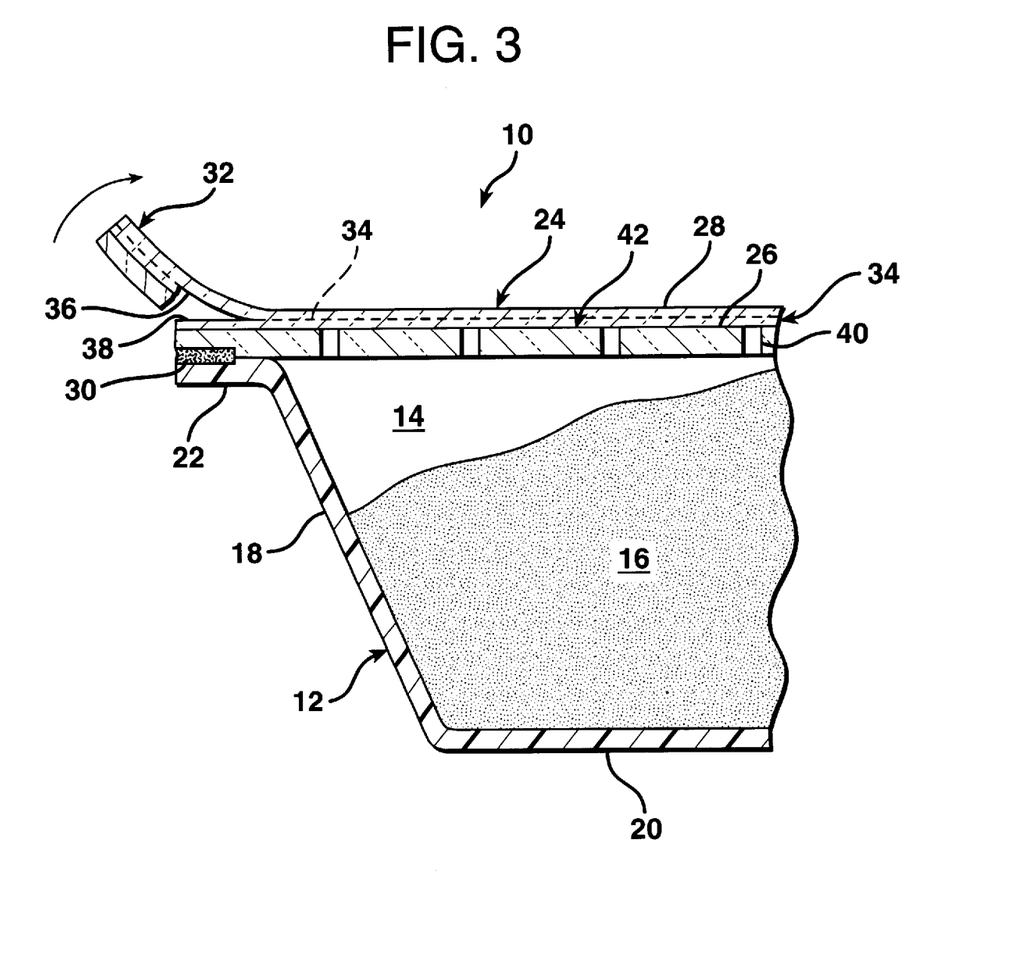
FIG. 3 is an enlarged cross-sectional view of a portion of the package illustrated in FIG. 2, wherein peelable delamination of the lid has been initiated.

FIG. 3 shows lid 24 as it begins to delaminate within gas-impermeable film 28 along plane 34 thereof, as viewed from the portion of package 10 shown in the circle in FIG. 2. Gas-permeable film 26 is bonded to gas-impermeable film 28 at interface 42 at a bond-strength which is greater than the intra-film cohesive strength between the gas-permeable portion 38 and gas-impermeable portion 36 of gas-impermeable film 28. Preferably, heat-weld 30 results in a bond between gas-permeable film 26 and support member 12 that is also greater than the intra-film cohesive strength between the gas-permeable portion 38 and gas-impermeable portion 36. In this manner, when lid 24 is subjected to a delaminating force as indicated by the arrow in FIG. 3, the lid delaminates within the gas-impermeable film such that the gas-permeable portion 38 remains bonded to the gas-permeable film 26, and the gas-impermeable portion 36 is removed from the package and discarded. However, gas-permeable film 26 remains bonded to support member 12 via heat-weld 30 and gas-permeable portion 38 remains bonded to gas-permeable film 26 via the bond between films 26 and 28 at interface 42.

The extended portion 32, which serves as a grippable tab to facilitate peeling, is preferably formed as disclosed in U.S. Ser. No. 08/814,671 entitled LIDDED PACKAGE HAVING A TAB TO FACILITATE PEELING and filed Mar. 11, 1997, the disclosure of which is hereby incorporated herein by reference. As shown in FIG. 3, peeling is initiated by grasping and pulling extended portion 32 in the direction of the arrow. Heat-weld 30 directs this delaminating force upwards, tearing substantially vertically through gas-permeable film 26 and gas-impermeable portion 38 of film 28. The delaminating force then propagates along plane 34 since it generally represents the weakest adhesive or cohesive bond in the laminate from which lid 24 is constructed.

Figure 4:
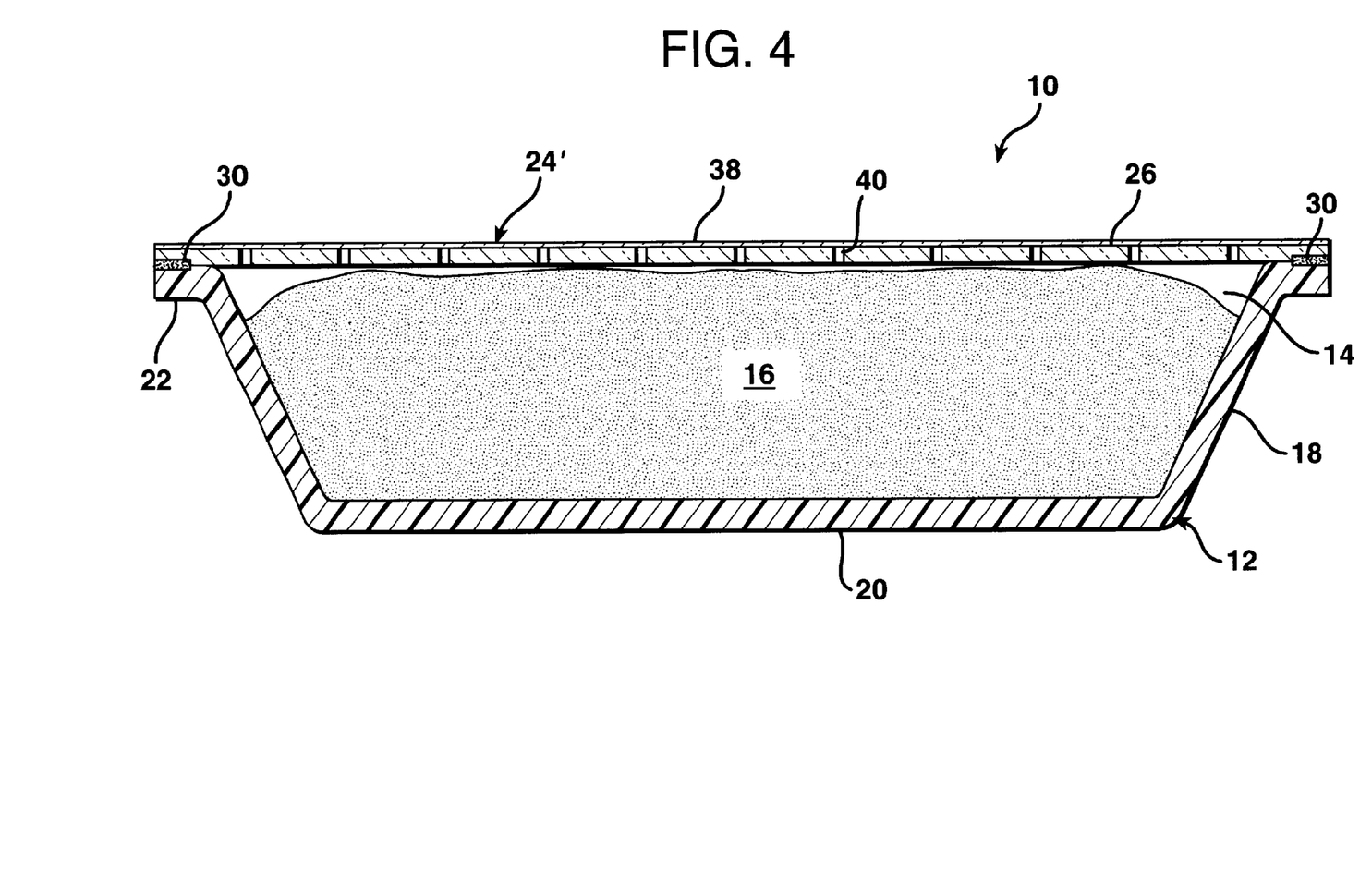
FIG. 4 is a cross-sectional view the package of FIGS. 2 and 3 wherein the lid has been peelably delaminated such that only a gas-permeable portion thereof remains lidded to the product support member.

The end result of the delamination process is shown in FIG. 4, wherein gas-impermeable portion 36 of gas-impermeable film 28 has been removed from package 10 such that only gas-permeable portion 38 of gas-impermeable film 28 and gas-permeable film 26 remain bonded to support member 12 as lid 24'. In this manner, product 16 remains fully enclosed within package 10, i.e., the gas-permeable lid 24' is still heat-welded to flange 22 of support member 12 via first heat-weld 30 and continues to protect the product from microbial and other contaminants. However, atmospheric oxygen can now enter the cavity 14 of package 10 through the now-exposed gas-permeable portion 38 and gas-permeable film 26. If product 16 is a fresh red meat or poultry product originally packaged in a gas which is lower in oxygen content than air, the oxygen will quickly cause re-bloom, thereby making package 10 ready for consumer display.

A preferred method for making package 10 is disclosed generally in the above-referenced and incorporated U.S. Ser. No. 08/814,671 entitled LIDDED PACKAGE HAVING A TAB TO FACILITATE PEELING. Such a method begins with providing a product support member 12 and placing in the cavity 14 thereof a product 16, preferably a fresh red meat product such as, beef, veal, lamb, pork, venison, etc. Lid 24 is then placed over the product-containing support member and heat-sealed to the flange 22 thereof as described above, thereby enclosing the product within the cavity. Lid 24 is preferably supplied from a larger web of the laminate, e.g., from a roll which is unwound to supply material as needed, by placing the web (not shown) over support member 12 and severing lid 24 from the web after or simultaneously with the heat-welding of the lid to the support member. Lid 24 can be severed from the web in this manner with any conventional cutting device, e.g., a sharp cutting instrument or a thermal cutting device such as a heated wire or heated blade.

The packaging method preferably includes, prior to enclosing the product within the support member, the step of at least partially evacuating the cavity of air and then at least partially filling the cavity with a gas which is lower in oxygen content than air. Any desired amount of air may be removed from the enclosure during the evacuation step, e.g., ranging from 1% to 99.999% by volume. In the case where a fresh red meat product is to be packaged, the amount of air removed preferably ranges from about 99% to about 99.999%, and more preferably from about 99.5% to about 99.999% by volume. Preferred gases to replace the evacuated air include, e.g., carbon dioxide, nitrogen, argon, etc., and mixtures of such gases. As a result of these steps, the cavity 14 of package 10 will preferably contain, prior to delamination of lid 24, less than 1% oxygen by volume, more preferably less than 0.5% oxygen, even more preferably less than 0.1% oxygen, and most preferably, less than 0.05% oxygen by volume, with the balance comprising a gas or mixture of gases, such as a mixture of carbon dioxide and nitrogen. When package 10 provides a substantially gas-impermeable enclosure, such a modified-atmosphere packaging environment ensures that a packaged fresh red meat product will have a shelf-life of at least seven days, more preferably at least ten days, even more preferably at least fourteen days and, most preferably, at least twenty one days (assuming, of course, that the package is maintained under refrigerated conditions, e.g., at temperatures ranging from about 28° F. to about 48° F.).

As mentioned above, when a fresh red meat product is maintained in a low-oxygen environment, it has a purple color which is aesthetically unappealing to most consumers. Thus, the final preferred step (or one of the final steps) in a packaging method according the present invention is to peelably remove the gas-impermeable portion 36 from film 28 so that air enters cavity 14 through the remaining, gas-permeable portion 38 of film 28 and gas-permeable film 26 to displace at least some of the gas which is lower in oxygen content than air. In this manner, atmospheric oxygen is permitted to come into contact with the packaged fresh red meat product and cause it to bloom to a bright red color which consumers associate with freshness.

Figure 5:
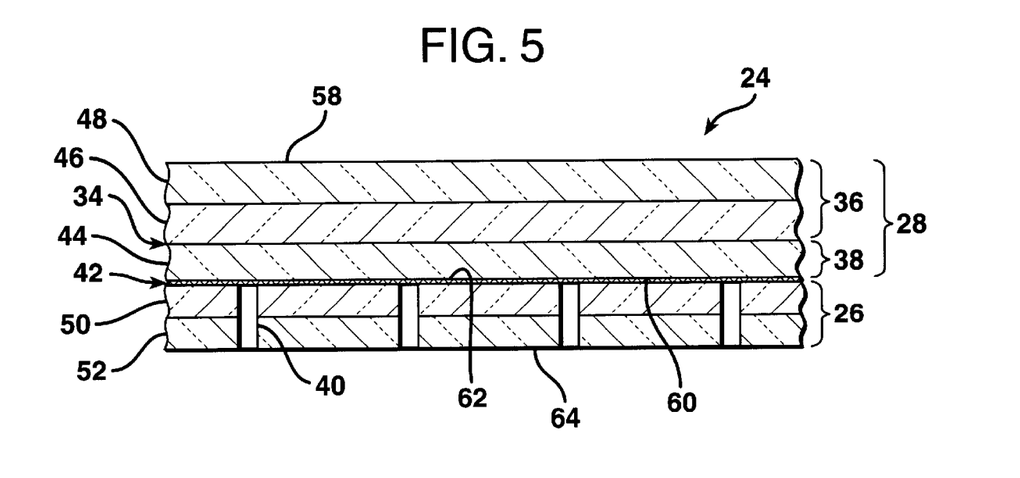
FIG. 5 is an enlarged cross-sectional view of the laminate which forms the lid for the package illustrated in FIGS. 1–3.
Figure 7:
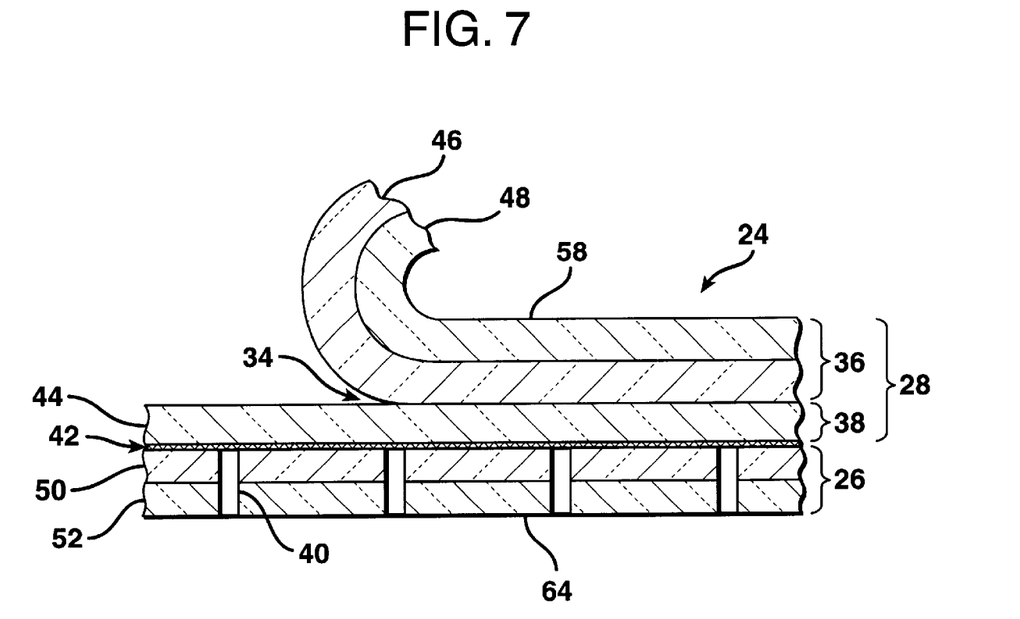
FIG. 7 illustrates the laminate of FIG. 5 as it delaminates into gas-permeable and gas-impermeable portions.

FIG. 5 illustrates a representative structure for lid/laminate 24. As shown, gas-impermeable film 28 preferably, but not necessarily, comprises at least a three-layer film including gas-permeable layer 44, release layer 46, and oxygen-barrier layer 48. Gas-permeable film 26 preferably, but not necessarily, comprises at least a two-layer film including bonding layer 50 and supporting layer 52. Films 26 and 28 are bonded via bonding layer 50 and gas-permeable layer 44 at interface 42. Film 28 is constructed such that it is capable of delaminating along plane 34 into a gas-impermeable portion 36, comprising release layer 46 and oxygen-barrier layer 48, and a gas-permeable portion 38 comprising gas-permeable layer 44 (see FIG. 7). Furthermore, the bond-strength between films 26 and 28 at interface 42 is greater than the intra-film cohesive strength between the gas-impermeable and gas-permeable portions 36 and 38 of gas-impermeable film 28. In the presently-described embodiment, the intra-film cohesive strength the gas-impermeable and gas-permeable portions of film 28 is provided by the inter-layer adhesion between gas-permeable layer 44 and release layer 46. Thus, laminate 24 is constructed such that the inter-layer adhesion between layers 44 and 46 is the weakest bond within the laminate. In this manner, laminate 24 delaminates within gas-impermeable film 28 when the laminate is subjected to a delaminating force such that gas-permeable layer 44 remains bonded to gas-permeable film 26 as shown in FIG. 7.

Accordingly, bonding layer 50 and gas-permeable layer 44, which are in contact with one another at the interface 42 of gas-impermeable film 28 and gas-permeable film 26, comprise materials that can be bonded together by a suitable lamination technique such that films 26 and 28 are bonded at a bond-strength that is greater than the intra-film cohesive strength between the gas-impermeable and gas-permeable portions 36 and 38 of gas-impermeable film 28. Suitable lamination techniques include, e.g., adhesive bonding; reactive surface modification (e.g., corona treatment, flame treatment, or plasma treatment); heat treatment; pressure treatment; etc., including combinations thereof.

Figure 6:
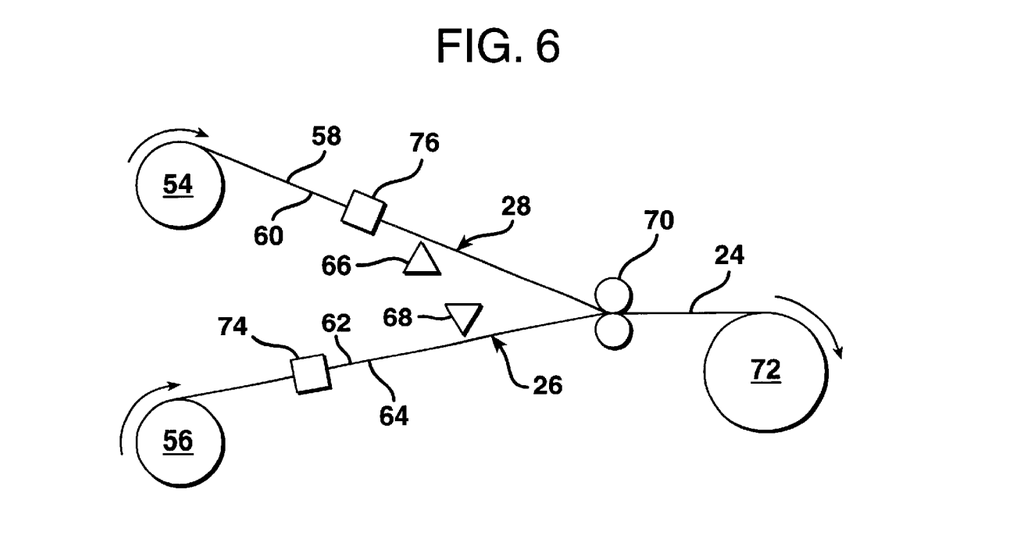
FIG. 6 is a schematic illustration of a process for making the laminate shown in FIG. 5.

A preferred lamination technique is reactive surface modification and, more preferably, corona treatment combined with pressure and, optionally, heat immediately after corona treatment. A preferred process is illustrated in FIG. 6, wherein gas-impermeable film 28 is unwound from storage roll 54 and gas-permeable film 26 is unwound from storage roll 56. Gas-impermeable film 28 has a first surface 58 formed by oxygen-barrier layer 48 and a second surface 60 formed by gas-permeable layer 44. Similarly, gas-permeable film 26 has a first surface 62 formed by bonding layer 50 and a second surface 64 formed by supporting layer 52. At least one, but preferably both, of surfaces 60 and 62 of respective films 28 and 26 are reactively-modified by respective corona treatment units 66 and 68. Bonding of films 26 and 28 is then completed by passing the films through nip rolls 70 which apply sufficient pressure to the films to create a bond at interface 42. Preferably, the nip rolls 70 also apply heat to films 26 and 28 to facilitate bonding thereof. Alternatively, films 26 and/or 28 can be pre-heated prior to being conveyed through nip rolls 70. The completed laminate 24 is then taken up on a storage roll 72 to be subsequently used for providing lids to packages as discussed below.

The amount of corona discharge to which the films are exposed is directly proportional to the amount of power supplied to the corona treatment units 66 and/or 68, and also to the speed at which the films are passed through the units. In general, corona treatment units operate by passing a high voltage electrical current through an electrode positioned adjacent a film surface to be treated. The electrode then produces an electrical discharge which ionizes the surrounding air to cause reactive surface modification, e.g., oxidation, of the treated film surface. Any desired combination of power input to the corona unit and film speed may be employed to achieve a desired bond-strength between the films. Such bond-strength is preferably greater than the intra-film cohesive strength within gas-impermeable film 28, i.e., greater than the adhesive force between gas-permeable layer 44 and release layer 46. In this manner, the laminate 24 will not delaminate at interface 42 between films 26 and 28 but will, instead, delaminate within the multilayer, gas-impermeable film 28. The amount of power to supplied to the corona treatment units 66, 68 may range, e.g., from about 0.02 to about 0.5 kilowatts (kw) per inch of film width and the film speed through the corona treatments unit may range, e.g., from about 10 to about 2000 feet/minute. Examples of suitable parameters are set forth in the examples which follow. Obviously, different applications and different laminate constructions from those set forth in the examples will entail different corona bonding parameters, such parameters being readily determinable by those of ordinary skill in the art of film and laminate manufacture based on the description set forth herein. Corona treatment units are commercially available, e.g., from Enercon Industries Corporation of Menomonee Falls, Wis.

Regardless of the particular lamination method employed to bond films 26 and 28, it is highly preferred that the materials from which layers 44 and 50 are formed are materials that are capable of forming a strong bond at interface 42. Although non-adhesive lamination techniques are preferred, primarily for reasons of economy, adhesive lamination can generally be successfully employed to form a strong bond when non-adhesive lamination is unable to provide a sufficiently strong bond between films 26 and 28.

In a particularly preferred embodiment of the present invention, gas-permeable film 26 is perforated as shown. Perforations 40 are preferably formed in gas-permeable film 26 prior to bonding film 26 to gas-impermeable film 28. As illustrated in FIG. 6, this may be accomplished by passing gas-permeable film 26 through a perforation device 74 before the film reaches nip rolls 70. Perforation device 74 may form perforations 40 by any suitable means, such as mechanically, chemically, and/or electrically. Non-limiting examples of such devices include those which perforate with laser energy, electrostatic discharge, ultrasonic waves, flame discharge, needles or other sharp objects, and combinations thereof.

Perforations 40 preferably extend completely through film 26 to form passageways therethrough that extend from first surface 62 to second surface 64. If desired, the perforations may extend only partially through film 26. The perforations may have any desired size to achieve a desired rate of re-bloom in a packaged meat product after peelable delamination of the gas-impermeable portion of the laminate. The perforations may range in size from, e.g., 5 to 2000 microns in diameter. An advantage of the present invention is that, since gas-permeable layer 44 remains bonded to the perforated gas-permeable film 26 after the gas-impermeable portion 36 of film 28 is removed, the perforations may be as large as needed to achieve a rapid rate of re-bloom without concern for leakage of liquids out of (or into) the package via the perforations, or the ingress of dirt or airborne contaminates into the package.

Another advantage of the present invention is that a label or printed image can be inserted between films 26 and 28 prior to the formation of laminate 24. This is illustrated schematically in FIG. 6 wherein gas-impermeable film 28 passes through printing or labeling station 76 prior to being bonded to gas-permeable film 26. At station 76, a printed image and/or label is applied to second surface 60 of film 28. If desired, an image and/or label could instead or in addition be applied to first surface 62 of film 26. In either case, the printed image and/or label is trapped between films 26 and 28 at interface 42 of the resultant laminate 24. More specifically, the printed image or label is trapped between the gas-permeable portion 38 of film 28 and the gas-permeable film 26 so that it remains with the laminate/lid 24 after the gas-impermeable portion 36 has been peelably removed at retail. In this manner, the printed image or label, which is applied during production of the laminate and not at retail, remains with the package on which the laminate is lidded after the gas-impermeable portion of the lid has been removed. Thus, product information and other important indicia can now be applied to the lid of a case-ready package at a central processing/packaging facility, and will remain on the package lid after removal of the gas-impermeable portion so that the information is visible to the consumer.

Referring now to FIG. 7, the mechanism by which laminate 24 delaminates within gas-impermeable film 28 at plane 34 will be explained in greater detail. The materials comprising layers 44, 46, and 50, as well as the particular lamination technique employed to bond films 26 and 28, are preferably selected so that the inter-layer adhesion between layers 44 and 46 represents not only the weakest component of the intra-film cohesive strength of gas-impermeable film 28, but also the weakest cohesive or adhesive bond within laminate 24. Thus, gas-permeable layer 44 preferably bonds more strongly with bonding layer 50 across interface 42 than with release layer 46 in the coextruded, gas-impermeable film 28. In this fashion, when laminate 24 is subjected to a delaminating force that is greater than the inter-film adhesion between layers 44 and 46, the delaminating force is channeled into the plane 34 between such layers, whereupon delamination occurs within film 28 at plane 34 between the gas-impermeable and gas-permeable portions 36 and 38, respectively. More particularly, as indicated in the embodiment shown in FIG. 7, release layer 46 and oxygen-barrier layer 48 of gas-impermeable film 28 are peelably removed from laminate 24 while gas-permeable layer 44 remains bonded to gas-permeable film 26.

As an alternative to inter-layer adhesive separation as a means of achieving delamination within gas-impermeable film 28 as shown, the gas-impermeable film may include a layer that internally (cohesively) separates when the laminate is exposed to a delaminating force. Such a cohesively separating layer would preferably be positioned where either gas-permeable layer 44 or release layer 46 are located in FIGS. 5 and 7.

A combination of inter-layer adhesive failure and intra-layer cohesive failure within gas-impermeable film 28 may also be employed, if desired, as a means of achieving delamination within such film. This can occur, e.g., when the primary plane of delamination is between two adjacent film layers as shown but the delamination path "wanders" into one or both of the adjacent film layers.

Regardless of the particular mechanism by which gas-impermeable film 28 is caused to delaminate when laminate 24 is subjected to a delaminating force, it is preferred that the intra-film cohesive strength between the gas-impermeable portion 36 and gas-permeable portion 38 of gas-impermeable film 28 ranges from about 0.001 to about 2.5 pounds per inch. This is preferably accomplished by constructing gas-impermeable film 28 such that the inter-layer adhesion between gas-permeable layer 44 and release layer 46 ranges from about 0.001 to about 2.5 pounds per inch. In this manner, when laminate 24 is subjected to a delaminating force ranging from 0.001 to 2.5 pounds per inch, the laminate delaminates along plane 34 between layers 44 and 46.

A more preferred intra-film cohesive strength between the gas-impermeable portion 36 and gas-permeable portion 38 of gas-impermeable film 28 ranges from 0.005 and 2 pounds/inch and, more preferably, between 0.01 and 1.5 pounds/inch.

An intra-film cohesive strength ranging from 0.001 to 2.5 pounds per inch provides a balance between sufficient adhesion to prevent premature separation during manufacture, shipping and storage, and sufficient peelability so that gas-impermeable film 28 can be delaminated without tearing or otherwise compromising the integrity of the remaining gas-permeable portion 38.

If necessary or desired, the inter-layer adhesion between adjacent layers 44 and 46 may be increased or decreased by the inclusion of additives into one or both layers which serve to promote or defeat adhesion between such layers. Examples of adhesion-promoting additives (i.e., to increase adhesion between layers 44 and 46) include, e.g., anhydride-modified or acid-modified polyolefins and polymers that have a relatively high affinity for the polymer(s) from which the other layer is formed. Examples of adhesion-defeating additives include, e.g., teflon, anti-block agents (e.g., silica, clay, or glass beads), anti-fog agents, etc.

As noted above, the laminate of the present invention is ideally suited for the packaging of fresh red meat and poultry products. In this regard, it is preferred that gas-permeable portion 38 together with gas-permeable film 26 admit a combined oxygen transmission rate therethrough of at least about 10,000 cc/m$^2$-24 hour-1 atmosphere, more preferably at least about 15,000 cc/m$^2$-24 hour-1 atmosphere. Most preferably, the oxygen transmission rate through gas-permeable portion 38 and gas-permeable film 26 is as high as possible (e.g., greater than 20,000 cc/m$^2$-24 hour-1 atmosphere) so that a packaged fresh red meat or poultry product will re-bloom fully and in as short a time-period possible (preferably within about 30 to 45 minutes) following the peelable removal of gas-impermeable portion 36 from gas-impermeable film 28.

Although gas-permeable film 26 may be perforated in order to provide a sufficiently high rate of oxygen transmission therethrough, it is highly preferred that gas-permeable portion 38 (e.g., gas-permeable layer 44 as illustrated) of gas-impermeable film 28 not be perforated for the reasons stated previously, i.e., so that package 10 is leak-proof after peelable removal of the gas-impermeable portion 36 of film 28. Thus, it is necessary that the gas-permeable layer 44 have a high rate of gas transmission therethrough. This may be accomplished by selecting a material or materials from which layer 44 is formed that has an inherently high rate of gas permeability and/or can be present as a very thin layer while maintaining a reasonable level of strength and integrity. In addition to meeting such gas-transmission-rate requirements, layer 44 must be capable of forming a stronger laminate bond with gas-permeable film 26 (i.e., across interface 42) than the intra-film bond with adjacent layer 46 in multilayer, gas-impermeable film 28. It has been determined that these requirements can be met when the gas-permeable layer 44 (or, more generally, gas-permeable portion 38) comprises a material selected from the group consisting of polymethylpentene homopolymer or copolymer, polyethylene homopolymer or copolymer, polypropylene homopolymer or copolymer, polyether-block-amide copolymer, polyether-polyester copolymer, copolyester, and polyvinyl chloride. Such materials have high oxygen-transmission rates (OTR) and/or can be made into thin layers, and have good release characteristics with adjacent layers in multilayer (e.g., coextruded) films. Preferred polyethylenes include ethylene/vinyl acetate copolymer, low density polyethylene, and blends thereof.

Because such materials have relatively lower OTRs than the other materials listed immediately above, they are preferred for use in VSP applications which generally have lower OTR requirements than MAP applications. Preferred polypropylenes are those homopolymers and copolymers (e.g., with ethylene comonomer) having some degree of atacticity which tends to break up the crystalline structure, thereby making the polymer more permeable and flexible. Typical OTRs for such polypropylenes are in the range of about 12,000 cc-mil/m$^2$-24 hour-1 atmosphere. Thus, at a thickness of 0.5 mil, the actual OTR would be 24,000 cc/m$^2$-24 hour-1 atmosphere. Such polypropylenes are sold by the Rexene Corporation under the trademark FPO™. Polyether-block-amide copolymers are commercially available from DuPont under the trademark HYTREL™, e.g., HYTREL™ 4078W polyether-block-amide copolymer having an OTR of about 33,600 cc-mil/m$^2$-24 hour-1 atmosphere. Preferred copolyesters are copolymers of polyether and polyethylene terephthalate, such as those which are commercially available from Eastman Chemical Products, Inc. under the trademarks ECDEL™ 9965, 9966, and 9967. Such copolyesters have an OTR of about 5,000 cc-mil/m$^2$-24 hour-1 atmosphere, and thus are primarily intended for use in VSP applications. Preferred polyvinyl chlorides are those that are plasticized. A highly preferred material for MAP applications is polymethylpentene homopolymer or copolymer (PMP). PMP homopolymers have a measured OTR of approximately 96,000 cc-mil/m$^2$-24 hour-1 atmosphere. Preferred PMPs are commercially available from Mitsui Petrochemicals (America), Ltd. under the trademark TPX™, such as TPX™ RT18 PMP homopolymer as described in the examples below.

With respect to the foregoing materials which are preferred for use in gas-permeable layer 44, there are a number of suitable polymers that can be used for bonding layer 50 to provide a strong laminate bond with layer 44, and for release layer 46 to provide peelable separation from layer 44. Non-limiting but merely representative examples of suitable polymers for layers 46 and 50 include ethylene/vinyl acetate copolymer (EVA), ethylene/methyl acrylate copolymer (EMA), anhydride-modified EVAs and EMAs, ethylene/butyl acrylate copolymer (EBA), polyesters and copolyesters such as PET and PETG, polyamides (PA), polycarbonate (PC), polyvinylidene chloride copolymers (PVDC), ethylene/vinyl alcohol copolymer, low density polyethylene (LDPE), high density polyethylene (HDPE), polypropylene homopolymer and copolymers such as propylene/ethylene copolymer (PEC), polystyrenes and styrene copolymers such as styrene-ethylene-butylene-styrene (SEBS) and styrene-butadiene-styrene (SBS) block copolymers, and blends of the foregoing materials.

Representative three-layer combinations of one or more suitable materials for layers 44, 46, and 50, based on initial selection of a material for gas-permeable layer 44, are set forth in Table 1 below. The listed materials may also be blended as desired, such blends preferably comprising one or more of the materials set forth within a given list of materials for layers 46 or 50.

TABLE 1

| Gas-permeable layer 44 | Release layer 46 | Bonding layer 50 |
|---|---|---|
| PMP | EVA, LDPE, EBA, EMA, SBS, or SEBS | EVA, EMA, EBA, PMP or anhydride-modified EVA or EMA |

TABLE 1-continued

| Gas-permeable layer 44 | Release layer 46 | Bonding layer 50 |
|---|---|---|
| Polyethylene | PP, PEC, PET, PETG or PA | EVA, EMA, EBA, or anhydride-modified EVA or EMA |
| Polypropylene | LDPE, HDPE, or EVA | EVA, EMA, EBA, or anhydride-modified EVA or EMA |
| Polyether-block-amide | LDPE, EBA, EMA, PP, PEC, PET, PETG, PC, HDPE, or EVA | PA, EVA, EMA, EBA, or anhydride-modified EVA or EMA |
| Polyester or copolyester | LDPE, EBA, EMA, PP, PEC, PA, HDPE, or EVA | PETG, PET, EMA, EVA, EBA, or anhydride-modified EVA or EMA |
| Polyvinyl chloride | EVA, EMA, or anhydride-modified EVA or EMA | EVA, anhydride-modified EVA, PVDC, SEBS, or SBS |

The material from which supporting layer 52 is formed is preferably capable of forming heat-weld 30 with the material from which the upper surface of flange 22 of support member 12 is formed so that the laminate can be secured to the support member as a lid. This may be accomplished in accordance with the teachings set forth in U.S. Pat. Nos. 4,847,148 and 4,935,089, and U.S. Ser. No. 08/326,176 now abandoned, filed Oct. 19, 1994 and entitled "Film/Substrate Composite Material," the disclosures of which are hereby incorporated herein by reference. Supporting layer 52, or other layers which may be included in gas-permeable film 26, should also be capable of providing strength to the lid after the gas-impermeable portion has been removed, e.g., so that the peeled packages can be placed in a stack in the retail display case with packages resting on the lids of underlying packages without tearing the lids. The particular choice of material(s) for the supporting layer(s) is thus dependent upon the material from which flange 22 is formed as well as the amount of strength needed for a given application. Generally, however, a suitable material can be selected from the representative list of suitable polymers set forth above for layers 46 and 50.

Oxygen-barrier layer 48 preferably comprises a material which provides a substantial barrier to the passage of gas, particularly oxygen, therethrough so that film 28 is substantially gas-impermeable. Suitable materials include, e.g., vinylidene chloride copolymer (saran), nylon, polyethylene terephthalate, ethylene/vinyl alcohol copolymer, silicon oxides (SiOx), etc. Other materials may also be employed in layer 48 as necessary or desired.

Gas-permeable film 26 and gas-impermeable film 28 may be cast, hot-blown, or oriented, and may have any desired thickness, ranging, e.g., from about 0.3 mils to about 12 mils. Preferably, the films range in thickness from about 0.4 mils to about 8 mils; more preferably from about 0.4 mils to about 5 mils; most preferably from about 0.5 to about 3 mils.

The above-described laminate and component film structures are intended to be representative only and not in any way limiting in scope of the present invention. A greater or lesser number of films or film layers may be included as desired or necessary. For example, it may be desirable to include abuse-resistant layers, e.g., over oxygen-barrier layer 48 in film 28. As a further example, gas-permeable film 26 may be a monolayer film formed from a material that can form good bonds with both gas-impermeable film 28 and support member 12. Specific laminate structures are illustrated in the Examples below.

The invention may be further understood by reference to the following examples, which are provided for the purpose of representation, and are not to be construed as limiting the scope of the invention.

EXAMPLES

Laminates produced in accordance with the present invention are set forth in the Examples below. The following materials were employed:

TIE1: BYNEL™ 50E555 anhydride-grafted polypropylene homopolymer having a 5.0 melt flow index, a density of 0.9 g/cc, and a melting point of 166° C.; supplied by DuPont.

TIE2: BYNEL™ E3861 anhydride-grafted ethylene/vinyl acetate copolymer; supplied by DuPont.

EVOH1: EVAL™ LC-E105A ethylene/vinyl alcohol copolymer having 44 mole % ethylene and a melting point of 166.5° C.; supplied by Eval of America.

EVOH2: EVAL™ LC-E151A ethylene/vinyl alcohol copolymer having 44 mole % ethylene and a melting point of 165° C.; supplied by Eval of America.

PA6: ULTRAMID™ B4; polyamide 6 (polycaprolactam) polymer having a melting point of 220° C.; obtained from BASF.

PA6,12: GRILON™ CF6S polyamide 6/12 copolymer having a melting point of 130° C.; obtained from Emser.

PA66,610: GRILON™ XE 3303 polyamide 66/610 copolymer having a melting point of 200° C.; obtained from Emser.

PA12: VESTAMIDE™Z7319 polyamide 12 (polylaural lactam) polymer; obtained from Huls America, Inc.

PP: ESCORENE™ PD-4062.E7 polypropylene homopolymer having a melting point of 163° C., a density of 0.9 g/cc, and a melt index of 3.6; supplied by Exxon.

LDPE1: LDPE 1321 low density polyethylene having a melt flow index of 0.22, a melting point of 111° C., and a density of 0.921 g/cc; obtained from Dow.

LDPE2: POLY-ETH 1017 low density polyethylene having a melt flow index of 7 and a density of 0.918 g/cc; obtained from Chevron.

PMP: TPX™ RT18 polymethylpentene having a density of 0.833 g/cc, a melting point of 240° C., and a melt flow of 26; obtained from Mitsui Petrochemicals (America), Ltd.

"eva/pp/pec": NORPROP™ 440CGW oriented, three-layer film obtained from the Norprop Films Division of Northern Petrochemical Co. and having the structure: ethylene vinyl acetate copolymer/polypropylene homopolymer/propylene-ethylene copolymer.

The film was 0.70 mils in thickness. "Perf(eva/pp/pec)" indicates that the film was perforated by a mechanical perforation device such that the film had perforations that were 1.1 mm$^2$ in area and present at a density of 18 perforations/cm$^2$.

PET: EASTAR™ PETG 6763 polyethylene terephthalate glycol produced from the condensation reaction of ethylene terephthalic acid cyclohexanedimethanol and ethylene glycol and having a glass transition temperature of 178° F.; obtained from Eastman Chemical.

EVA: EXXON XR32.89 ethylene/vinyl acetate copolymer having 4% vinyl acetate and a melt index of 10; obtained from Exxon Chemical.

For each of the multilayer film and laminate structures shown in the Examples, single slashes (/) indicate an intra-film (i.e., layer/layer) interface; underlined single slashes (/)

indicate a peelable intra-film interface; and double slashes (//) indicate an inter-film (i.e., film/film) interface. Unless otherwise indicated, all percentages are weight percentages.

Example 1

A gas-impermeable, multilayer film was formed by cast coextrusion as a tubular film that was then slit to make a flat film that was, on average, 6 mils in thickness (1 mil=0.001 inch). The film had the following structure:

PP/TIE/EVOH/80% PA6+20% PA6,12/TIE/LDPE/PMP

A laminate was then formed as follows. The PMP exterior layer of the above gas-impermeable film was exposed to corona radiation at a dosage of 100 watts/inch of film width from a corona treatment unit obtained from Enercon Industries Corp. The ethylene/vinyl acetate (eva) exterior layer of Norprop™ perf(eva/pp/pec) film was also exposed to 100 watts/inch of corona radiation. The two films were then bonded together by passing the two films, with the corona-treated surfaces in contact with one another, through a pair of nip rollers which were maintained at 150° F. and applied a pressure of 95 pounds/in$^2$ (psi) to the two films. The films traveled through the corona treatment units and nip rollers at a speed of 50 feet/minute. The resultant laminate had the following structure:

PP/TIE/EVOH/80% PA6+20% PA6,12/TIE/LDPE/PMP//perf(eva/pp/pec)

The laminate was then successfully delaminated at the LDPE/PMP interface by adhering a piece of adhesive tape to each exterior surface of the laminate (i.e., the PP and pec exterior layers) and then applying an average delaminating force of 0.0125 pounds/inch (based on an average of 6 tested samples) to the laminate. Thus, the PMP layer (gas-permeable portion) of the gas-impermeable film remained bonded to the perf(eva/pp/pec) (gas-permeable) film because the intra-film cohesive strength between the PMP and LDPE layers of 0.0125 pounds/inch was less than the bond-strength between the PMP layer of the gas-impermeable film and perf(eva/pp/pec) film.

The laminate thus delaminated into a gas-impermeable portion having the structure:

PP/TIE/EVOH/80% PA6+20% PA6,12/TIE/LDPE, and a gas-permeable portion having the structure:

PMP//perf(eva/pp/pec).

The gas-impermeable portion was tested for oxygen transmission therethrough in accordance with ASTM D 3985-95. Three tested samples were found to exhibit an oxygen transmission rates (OTR) of 3.1 (6.52 mils thickness), 3.6 (5.68 mils), and 4.1 (5.39 mils) cc/m$^2$-24 hrs.-atm. @73° F. and 0% R.H. Such OTR values are sufficiently low for the packaging of fresh red meat and poultry.

The gas-permeable portion was also tested for oxygen transmission in accordance with ASTM D 3985-95. Three tested samples were found to exhibit an OTR ranging from 150,000 to 190,000 cc/m$^2$-24 hrs.-atm. @73° F. and 0% R.H. (based on sample thicknesses of approximately 0.85 mils). This is sufficiently high that, when the laminate of this example is used as a lidding film for either vacuum-skin or modified-atmosphere packaging of fresh red meat or poultry, the remaining gas-permeable laminate (PMP//perf(eva/pp/pec)) after peelable removable of the gas-impermeable portion will readily allow a packaged fresh red meat or poultry product to bloom in a short period of time to an aesthetically pleasing color that consumers associate with freshness.

Example 2

A gas-impermeable, multilayer film was formed by cast coextrusion as a tubular film that was then slit to make a flat film that was, on average, 2.6 mils in thickness. The film had the following structure:

PA BLEND/EVOH2/TIE2/LDPE1/TIE2/PET/50% LDPE2+50% EVA (where "PA BLEND"=70% PA6+20% PA66,610+10% PA12).

A laminate was then formed as described above in Example 1, resulting in a laminate having the following structure:

PA BLEND/EVOH2/TIE2/LDPE1/TIE2/PET/50% LDPE2+50% EVA//perf(eva/pp/pec)

The laminate was then successfully delaminated at the PET/LDPE+EVA interface by adhering a piece of adhesive tape to each exterior surface of the laminate and then applying an average delaminating force of 0.0318 pounds/inch (based on an average of 5 tested samples) to the laminate. Thus, the LDPE+EVA layer (gas-permeable portion) of the gas-impermeable film remained bonded to the perf(eva/pp/pec) (gas-permeable) film because the intra-film cohesive strength between the PET and LDPE+EVA layers of 0.0318 pounds/inch was lower than the bond-strength between the LDPE+EVA layer of the gas-impermeable film and the perf(eva/pp/pec) film. The laminate thus delaminated into a gas-impermeable portion having the structure:

PA BLEND/EVOH2/TIE2/LDPE1/TIE2/PET, and a gas-permeable portion having the structure:

50% LDPE2+50% EVA//perf(eva/pp/pec).

The gas-impermeable portion was tested for oxygen transmission therethrough in accordance with ASTM D 3985-95. Three tested samples were found to exhibit oxygen transmission rates (OTRs) of 8.5 (2.41 mils thickness), 8.8 (2.17 mils), and 9.2 (2.32 mils) cc/m$^2$-24 hrs.-atm. @73° F. and 0% R.H. Such OTR values are sufficiently low for the packaging of fresh red meat and poultry.

The gas-permeable portion was also tested for oxygen transmission in accordance with ASTM D 3985-95. Three tested samples having an average thickness of about 0.9 mil were found to exhibit OTR values of 13,990, 15,110, and 18,030 cc/m$^2$-24 hrs.-atm. @73° F. and 0% R.H. This is sufficiently high that, when the laminate of this example is used as a lidding film for vacuum-skin packaging of fresh red meat or poultry, the remaining gas-permeable laminate will allow a packaged fresh red meat or poultry product to re-bloom in a short period of time.

Example 3

Peelable vacuum skin packages for ribeye steaks (approx. ¾ inch in thickness) were made from the laminate of Example 2 by using sheets of the laminate to construct both the support member and lid. The VSPs were made on a MULTIVAC™ ULTRAVAC™ VSP packaging machine. The lid portion of the packages were thermoformed about the contour of the steaks and sealed to the nonthermoformed support member. The package interiors were evacuated to a pressure of 1 torr and the steaks were thereby reduced to a purple color. The steaks were stored for 5 days at 32° F. and retained their purple color during this period, indicating that the laminates successfully formed a gas-impermeable enclosure sufficient to preserve the shelf-life of the steaks.

The gas-impermeable portion of the lids were then peelably removed, whereupon the steaks all fully re-bloomed to a bright red color within 2 minutes of peeling. This indicated that the remaining gas-permeable portion of the laminates were of sufficient gas-permeability for use in VSP applications.

A total of eight packages were made and peeled in this manner. In six of the packages, the gas-impermeable portion of the laminate delaminated smoothly from the remaining gas-permeable portion. In two of the packages, however, small portions of the gas-permeable (LDPE+EVA) layer remained bonded to the rest of the gas-impermeable film. This occurred at severe transitional angles in the contour of the steaks and is correctable by reducing the intra-film cohesive force between the gas-permeable (LDPE+EVA) layer and the remainder of the gas-impermeable film.

The foregoing description of preferred embodiments of the invention has been presented for purposes of illustration and description. It is not intended to be exhaustive or to limit the invention to the precise form disclosed, and modifications and variations are possible in light of the above teachings or may be acquired from practice of the invention.

What is claimed is:

1. A laminate, comprising:
   a. a multilayer, substantially gas-impermeable film capable of delaminating into a non-perforated gas-permeable portion and a gas-impermeable portion, said gas-permeable portion in adherence with said gas-impermeable portion at a predetermined intra-film cohesive strength;
   b. a perforated, gas-permeable film bonded to said gas-permeable portion of said gas-impermeable film at a bond-strength that is greater than the intra-film cohesive strength between said gas-permeable and gas-impermeable portions of said gas-impermeable film, whereby, when said laminate is subjected to a delaminating force, said laminate delaminates within said gas-impermeable film such that said non-perforated gas-permeable portion of said gas-impermeable film remains bonded to said perforated gas-permeable film, thereby preventing liquids or dirt from passing through perforations in said gas-permeable film; and
   c. a printed image or label trapped between said gas-impermeable and gas-permeable films.

2. The laminate of claim 1, wherein the intra-film cohesive strength between said gas-permeable and gas-impermeable portions of said gas-impermeable film ranges from about 0.001 to about 2.5 pounds per inch.

3. The laminate of claim 1, wherein said gas-permeable portion of said gas-impermeable film and said gas-permeable film admit a combined oxygen transmission rate therethrough of at least about 10,000 cc/m$^2$-24 hour-1 atmosphere.

4. The laminate of claim 1, wherein said gas-permeable portion of said gas-impermeable film comprises a material selected from the group consisting of polymethylpentene homopolymer or copolymer, polyethylene homopolymer or copolymer, polypropylene homopolymer or copolymer, polyether-block-amide copolymer, polyether-polyester copolymer, copolyester, and polyvinyl chloride.

5. The laminate of claim 4, wherein said gas-permeable portion of said gas-impermeable film comprises polymethylpentene homopolymer or copolymer.

6. The laminate of claim 1, wherein said laminate further comprises a reactively-modified surface on at least one said gas-impermeable film or said gas-permeable film.

7. A laminate, comprising:
   a. a multilayer, substantially gas-impermeable film capable of delaminating into a gas-permeable portion and a gas-impermeable portion, said gas-permeable portion in adherence with said gas-impermeable portion at a predetermined intra-film cohesive strength;
   b. a gas-permeable film bonded to said gas-permeable portion of said gas-impermeable film at a bond-strength that is greater than the intra-film cohesive strength between said gas-permeable and gas-impermeable portions of said gas-impermeable film, whereby, when said laminate is subjected to a delaminating force, said laminate delaminates within said gas-impermeable film such that said gas-permeable portion of said gas-impermeable film remains bonded to said gas-permeable film; and
   c. a printed image or label trapped between said gas-impermeable and gas-permeable films, whereby, the printed image or label remains trapped between said gas-permeable film and said gas-permeable portion of said gas-impermeable film after said laminate delaminates.

8. The laminate of claim 7, wherein the intra-film cohesive strength between said gas-permeable and gas-impermeable portions of said gas-impermeable film ranges from about 0.001 to about 2.5 pounds per inch.

9. The laminate of claim 7, wherein said gas-permeable film is perforated.

10. The laminate of claim 7, wherein said gas-permeable portion of said gas-impermeable film and said gas-permeable film admit a combined oxygen transmission rate therethrough of at least about 10,000 cc/m$^2$-24 hour-1 atmosphere.

11. The laminate of claim 7, wherein said gas-permeable portion of said gas-impermeable film comprises a material selected from the group consisting of polymethylpentene homopolymer or copolymer, polyethylene homopolymer or copolymer, polypropylene homopolymer or copolymer, polyether-block-amide copolymer, polyether-polyester copolymer, copolyester, and polyvinyl chloride.

12. The laminate of claim 11, wherein said gas-permeable portion of said gas-impermeable film comprises polymethylpentene homopolymer or copolymer.

* * * * *